United States Patent [19]

Schultz

[11] Patent Number: 4,947,691
[45] Date of Patent: Aug. 14, 1990

[54] HIGH PRESSURE SHOWER GAUGE FOR PAPERMAKING MACHINE

[75] Inventor: Gary V. Schultz, Kimberley, Wis.

[73] Assignee: Appleton Mills, Appleton, Wis.

[21] Appl. No.: 339,104

[22] Filed: Apr. 14, 1989

[51] Int. Cl.⁵ .............................................. G01L 9/04
[52] U.S. Cl. .................................... 73/753; 73/861.71; 338/4
[58] Field of Search ............. 73/861.71, 861.39, 117.4, 73/3, 753, 700, 756, 714; 338/4

[56] References Cited

U.S. PATENT DOCUMENTS 3,424,000  1/1969  Chelner et al. ................. 73/861.71

OTHER PUBLICATIONS

Doolittle et al, Disclosure Bulletin, vol. 1, No. 5, Feb. 1959, p. 10.

Primary Examiner—Donald O. Woodiel
Attorney, Agent, or Firm—Andrus, Sceales, Starke & Sawall

[57] ABSTRACT

A gauge for measuring the pressure of a shower or water spray used in a papermaking machine. The gauge includes a body and an arm extends laterally outward from one end of the body and is adapted to be supported on a water conduit or pipe that contains a shower of nozzles. An alignment plate is mounted on the body and has an opening to receive the liquid stream being discharged from the nozzle. A pressure sensing device is located on the opposite side of the alignment plate, and the liquid stream passing through the opening in the alignment plate will strike the pressure sensing device to generate an electrical signal in proportion to the pressure. The electrical signal is then transformed into a measurement of pressure in psi which is displayed on a readout or gauge mounted on the body. The arm can be adjustably connected to the body to thereby adjust the spacing between the nozzle and the pressure sensor, depending upon the diameter of the water conduit.

14 Claims, 1 Drawing Sheet

U.S. Patent   Aug. 14, 1990   4,947,691
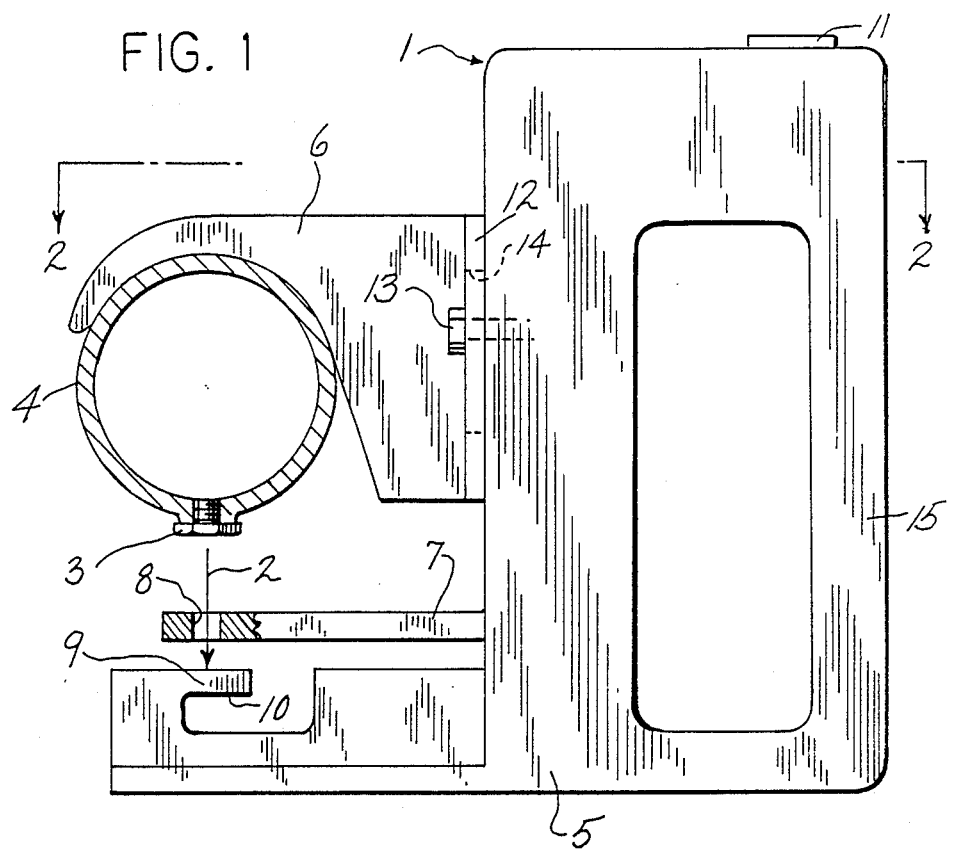
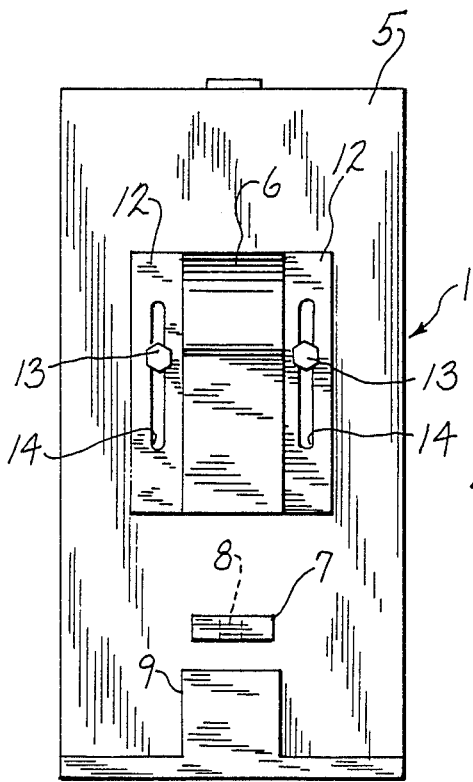
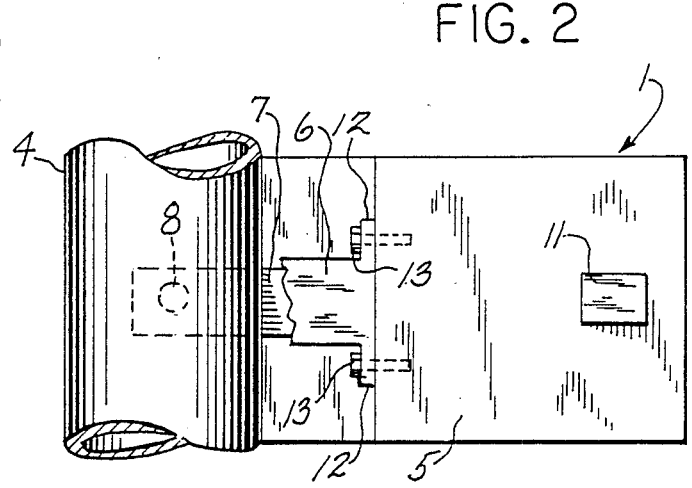

HIGH PRESSURE SHOWER GAUGE FOR PAPERMAKING MACHINE

BACKGROUND OF THE INVENTION

In a papermaking machine, the fabric that supports the paper web is conditioned by passing the fabric beneath high pressure water showers or jets. The water shower, which is generally operating at a pressure of about 400 psi, has a diameter of about 0.040 inch and acts to clean the fabric as well as redistributing the fibers.

In some situations, a series of showers are mounted transversely across the path of travel of the fabric, while in other situations one or more showers may move in a reciprocating path across a portion of the width of the fabric. The showers also provide the desired moisture profile across the width of the fabric.

The pressure of the water being discharged from the nozzles is initially calculated from the pressure of the water in the main and the diameter of the nozzle. However, during use, the nozzle orifice may be enlarged through wear or erosion, or the nozzle size may be decreased by virtue of clogging. In addition, the main pressure may vary considerably from the original pressure. Because of this, it has been found that the pressure in the nozzles may vary considerably from the original or desired pressure. If the pressure is too low, the cleaning and conditioning action will be less effective, while if the pressure is too high, the fibrous material can be damaged or displaced.

Because of the high pressure of the water being discharged from the nozzles, a pressure gauge cannot be manually held in the jet stream without considerable movement of the gauge making readings unreliable. Therefore, there has been a need for a manually operated gauge which will accurately measure the high pressure discharge of the spray nozzles.

SUMMARY OF THE INVENTION

The invention is directed to a manually operated gauge which can be used to accurately measure the pressure of individual shower nozzles in a papermaking machine. The gauge includes an elongated body and an arm extends outwardly from one end of the body and is adapted to be engaged with the upper surface of a water conduit or pipe. An alignment plate is mounted on the body at a location beneath the arm and is provided with an opening which receives the water stream discharged from the shower nozzle.

Located on the opposite side of the alignment plate is a pressure sensor, which can take the form of a strain gauge or pressure transducer. The water stream passing through the opening in the alignment plate will strike the pressure sensor, creating an electrical signal in proportion to the pressure of the water stream. The electrical signal can then be converted to a digital readout of pressure that is visually displayed on the body.

In order to accommodate water pipes of different diameters, the arm can be adjustably mounted on the body to vary the distance between the arm and the pressure sensor.

A handle is associated with the body, so that the operator using the handle can position the arm over the pipe and the pressure of the water stream against the pressure sensor will urge the arm into bearing engagement with the pipe to hold the gauge in a steady position for the reading.

In use, the arm is engaged with the water pipe at a location opposite the nozzle in the pipe, and the body is then rotated relative to the water pipe to bring the water stream into registry with the opening in the alignment plate, thus insuring that the water will be directed normal or perpendicular to the pressure sensor.

The gauge has particular application for measuring the pressure of the water being discharged from showers in a papermaking machine. Normally the gauge would be used to measure the pressure at the various nozzles during downtime of the machine, but depending upon the construction of the machine, it is possible that measurements can be taken of certain nozzles while the machine is in operation.

The invention provides a manually operable gauge which will accurately measure the discharge pressure of water or other fluid being discharged from a nozzle. Other objects and advantages will appear in the course of the following description.

DESCRIPTION OF THE DRAWINGS

The drawings illustrate the best mode presently contemplated of carrying out the invention.

In the drawings:

FIG. 1 side elevation of the gauge of the invention as used to measure the pressure of a water shower in machine;

FIG. 2 is a section taken along line 2—2 of 1; and

FIG. 3 is a front elevational view of the gauge.

DESCRIPTION OF THE ILLUSTRATED EMBODIMENT

The drawings illustrate a gauge 1 to be used in measuring the pressure of a high pressure stream 2 of fluid, such as water, which is being discharged from a nozzle 3. Nozzle 3 is connected to a generally horizontal manifold or pipe 4 which contains water under pressure. In use, a series of nozzles 3 may be mounted in the pipe 4 and extend across the width of a papermaking machine. The nozzles 3 and pipe 4 can be fixed with respect to the machine, or alternately, the nozzles and pipe may be moved in a reciprocating path across the width of the machine.

In use, the nozzles direct the high pressure spray against the fabric, such as a papermaker's felt, and act to clean the felt, redistribute the fibers and provide the desired moisture profile across the width of the felt.

Gauge 1 includes an elongated body 5 and an arm 6 extends laterally from the body, and in use of the gauge, is adapted to rest against the surface of the pipe 4, as seen in FIG. 1.

Mounted to the lower end of body 5 is a generally flat plate or guide 7 having an opening or hole 8 that is positioned in alignment with the water stream being discharged from nozzle 3. In practice, the water stream may have a diameter of about 0.040 inch and the hole 8 has a diameter of about −0.125 inch so that the stream will pass freely through the hole.

Located on the opposite side of plate 7 is a pressure sensor 9 which may take the form of a strain gauge. Sensor 9 has a deformable arm 10 that is located in alignment with hole 8 so that the water stream passing through the hole will strike arm 10, deflecting the arm downwardly, with the magnitude of deflection being proportional to the pressure of the water stream.

Strain gauge 9 is a conventional type and generates an electrical signal in accordance with the deflection of arm 10 and the electrical signal is converted to a digital readout of pressure in psi that is visually displayed in window 11.

The gauge can be operated by an outside power source, or alternately, can be battery operated with the batteries located in a compartment in body 5.

As the water pipes 4 may have different diameters, a provision is made to adjust the position of arm 6 relative to sensor 9. In this regard, arm 6 can be mounted for longitudinal movement on body 5 through a bolt and slot connection. As shown in FIG. 3, side flanges 12 extend laterally from arm 6 and bolts 13 extend through slots 14 in flanges 12 and are threaded in holes in body 5. By loosening bolts 13, arm 6 can be moved relative to body 5 to accommodate pipes of different diameter and insure that the nozzle 3 will be at a predetermined distance from sensor 9.

To facilitate transporting and manipulation of the gauge, handle 15 is associated with body 5 and extends outwardly from the body in a direction opposite to that of arm 6.

In use, the position of arm 6 is adjusted, depending upon the diameter of the pipe 4. The operator then places arm 6 against the pipe 4 and rotates body 5 until the water stream passes freely through hole 8 in plate 7, thus insuring that the water stream is normal or perpendicular to arm 10 of sensor 9. The high pressure water stream will strike arm 10, tending to deflect arm 10 and creating an electrical signal which is converted to a digital pressure readout in window 11. The thrust of the high pressure stream is resisted by the engagement of arm 6 with the pipe 4, so that the gauge can be maintained in a steady condition during the measurement.

The apparatus of the invention provides a manually operated gauge that will accurately measure the pressure of the high pressure stream of liquid being discharged from a papermaking shower.

Various modes of carrying out the invention are contemplated as being within the scope of the following claims particularly pointing out and distinctly clamping the subject matter which is regarded as the invention.

I claim:

1. A gauge for measuring the pressure of a stream of fluid being discharged from a nozzle, said nozzle being connected to a conduit containing said fluid under pressure, said apparatus comprising a body, an arm extending laterally outward from said body and disposed to engage said conduit, and pressure sensing means spaced from said arm and disposed in the path of the fluid being discharged from said nozzle for measuring the pressure of said stream, aligning means for affecting perpendicular alignment of the fluid stream with said sensing means, said aligning means comprising an aligning member extending laterally outward from said body and having an opening to receive the fluid stream.

2. The gauge of claim 1, wherein said pressure sensing means includes a deformable element disposed in alignment with said opening and located in position to be contacted by said fluid stream passing through said opening.

3. The gauge of claim 1, and including display means on said body for visually displaying the pressure measured by said sensing means.

4. The gauge of claim 1, and including handle means connected to said body for manually transporting said gauge.

5. The gauge of claim 4, wherein said arm and said aligning member project laterally outward from said body in a first direction and said handle means projects laterally outwardly from said body in the opposite direction.

6. A gauge for measuring the pressure of a stream of water being discharged from a nozzle connected to a water conduit, said apparatus comprising a body, an arm extending laterally outward from said body and disposed to engage said conduit, aligning means connected to the body and located in longitudinal alignment with said arm, said aligning means being disposed in spaced alignment with said nozzle and having an opening to receive said stream of water, and pressure sensing means mounted on said body in spaced relation to said aligning means and aligned with said opening for providing a measurement of the pressure of said stream.

7. The apparatus of claim 6, wherein said sensing means includes a deformable member mounted in position to be engaged by said stream and constructed to generate an electrical signal in proportion to the magnitude of the pressure of said stream, said electrical signal being converted to a visual reading of said pressure.

8. The gauge of claim 7, wherein said sensing means comprises a strain gauge.

9. The gauge of claim 6, and including adjusting means for varying the distance between said arm and said sensing means.

10. The gauge of claim 6, wherein said arm generally curved surface to engage said conduit.

11. The gauge of claim 6, and including a handle connected to said body, said arm and said aligning means extending laterally from said body in one direction and said handle extending laterally from said body in the opposite direction.

12. A gauge for measuring the pressure of a stream of fluid being discharged from a nozzle, said nozzle being connected to a conduit containing said fluid under pressure, said apparatus comprising a body, an arm extending laterally outward from said body and disposed to engage said conduit, pressure sensing means spaced from said arm and disposed in the path of the fluid being discharged from said nozzle for measuring the pressure of said stream, and aligning means for effecting perpendicular alignment of the fluid stream with said sensing means, said aligning means being spaced between said arm and said sensing means.

13. A gauge for measuring the pressure of a stream of fluid being discharged from a nozzle, said nozzle being connected to a conduit containing said fluid under pressure, said apparatus comprising a body, an arm extending laterally outward from said body and disposed to engage said conduit, and pressure sensing means spaced from said arm and disposed in the path of the fluid being discharged from said nozzle for measuring the pressure of said stream, said pressure sensing means comprising a strain gauge.

14. A gauge for measuring the pressure of a stream of fluid being discharged from a nozzle, said nozzle being connected to a conduit containing said fluid under pressure, said apparatus comprising a body, an arm extending laterally outward from said body and disposed to engage said conduit, pressure sensing means spaced from said arm and disposed in the path of the fluid being discharged from said nozzle for measuring the pressure of said stream, and adjusting means for varying the distance between said arm and said sensing means.

* * * * *